US012792297B2

(12) United States Patent
Pinder

(10) Patent No.: US 12,792,297 B2
(45) Date of Patent: Nov. 10, 2026

(54) APPARATUS, SYSTEM AND METHOD FOR VOICE CONTROLLED CHANNEL CHANGE OF A RADIO

(71) Applicant: MOTOROLA SOLUTIONS, INC., Chicago, IL (US)

(72) Inventor: Ellis A Pinder, Davie, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 781 days.

(21) Appl. No.: 18/057,042

(22) Filed: Nov. 18, 2022

(65) Prior Publication Data

US 2024/0168707 A1 May 23, 2024

(51) Int. Cl.

*G10L 15/00* (2013.01)
*G06F 3/16* (2006.01)
*H04B 7/00* (2006.01)
*H04M 1/00* (2006.01)
*H04M 11/04* (2006.01)

(52) U.S. Cl.

CPC ............ *G06F 3/167* (2013.01); *H04M 11/04* (2013.01)

(58) Field of Classification Search

USPC ........ 455/1–344, 899; 704/1–275; 706/1–62, 706/900–917

See application file for complete search history.

(56) References Cited

U.S. PATENT DOCUMENTS 10,636,423 B2 4/2020 Stogner et al.
11,195,529 B2 12/2021 Stogner et al.
2002/0109612 A1* 8/2002 Simon ...................... G08G 5/26 340/988
2003/0236664 A1 12/2003 Sharma
2007/0254649 A1* 11/2007 Klein .................... H03J 1/0091 455/434
2010/0087199 A1* 4/2010 Chowdhary .......... H04W 72/30 455/450
2012/0259639 A1* 10/2012 Yeh ..................... G06F 3/04842 704/E15.001
2014/0349588 A1* 11/2014 Corretjer ............... G06F 3/0346 455/73
2019/0259382 A1* 8/2019 Stogner ................... G10L 15/18

(Continued)

OTHER PUBLICATIONS

The International Search Report and the Written Opinion, corresponding patent application No. PCT/US2023/035899 filed: Oct. 25, 2023, mailed Jan. 23, 2024, all pages.

(Continued)

*Primary Examiner* — Marcellus J Augustin
(74) *Attorney, Agent, or Firm* — Barbara R. Doutre

(57) ABSTRACT

A method, communication system, and two-way radio provide for improved voice controlled channel change through detection of a voice command input at the two-way radio to change a dispatch communication channel from a current channel to a target channel, the voice command including a target channel name. A computed channel change confidence level is compared to a channel change confidence threshold. The channel change confidence threshold(s) may be adaptively configured based on channel context parameters monitored by two-way radio itself and/or monitored by the system. User alerts, inquiries, and/or confirmation request are generated in response to m moderate channel change confidence levels.

21 Claims, 3 Drawing Sheets

(56) References Cited

U.S. PATENT DOCUMENTS

| | | | | |
|---|---|---|---|---|
| 2021/0304746 | A1* | 9/2021 | King | G06F 3/167 |
| 2022/0086108 | A1* | 3/2022 | Higgins | G06Q 10/06395 |

OTHER PUBLICATIONS

Tan, Ying Bin et al.: "System and Method for Virtual Assistant Execution of Ambiguous Command", U.S. Appl. No. 17/304,114, filed Jun. 15, 2021, all pages.

* cited by examiner

APPARATUS, SYSTEM AND METHOD FOR VOICE CONTROLLED CHANNEL CHANGE OF A RADIO

FIELD OF THE INVENTION

The present invention relates generally to communication systems, and more particularly to voice controlled channel change of radios operating within a communication system.

BACKGROUND

Communication systems, particularly those used in public safety environments, such as law enforcement, fire rescue, heavy industrial, and other mission-critical environments, rely on proper two-way radio operations. There is an ever increasing desire for a voice control feature in next generation two-way radios that will enable users to perform certain radio control operations by using voice as an input medium to the radio device. However, there are challenges unique to public safety and industrial two-way (half-duplex) communications to take into consideration when attempting to design a voice control feature that allows for hands-free and eyes-up usage of a critical radio function. One such critical radio function is the channel change function.

The ability to provide voice control operation for the channel change function of a two-way radio presents several challenges. Known manual operation of the channel change function may include knob, button, and/or menu activations, and may additionally include a zone select operation to access a particular group of channels (or talkgroups). A zone is a logical grouping of channels and/or talkgroups, and zones are often used for geographical or functional grouping. Channels and zones are typically given descriptive names, and in some two-way radio applications, the same channel name may be used on two or more zones.

While some speech recognition options are available on certain types of consumer communication devices, such as cellular phones, tablets, and laptops, speech recognition on two-way radios have additional challenges due to harsh environmental operating conditions such as loud noise environments which may include sirens and/or loud industrial machinery. For industrial users or first responder users of two-way radios, incorrect recognition could impair safety by incorrectly configuring communications. For example, a misunderstood channel change could place the radio on a channel where expected communication is not received or a call by the user for assistance may be not be heard by others. Channel change, and by relation zone change, are thus considered safety-critical operations by many radio users and the speech recognition and execution of such commands must be done with the highest confidence.

Accordingly, there is a need for improved channel change voice control operation of a two-way radio.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
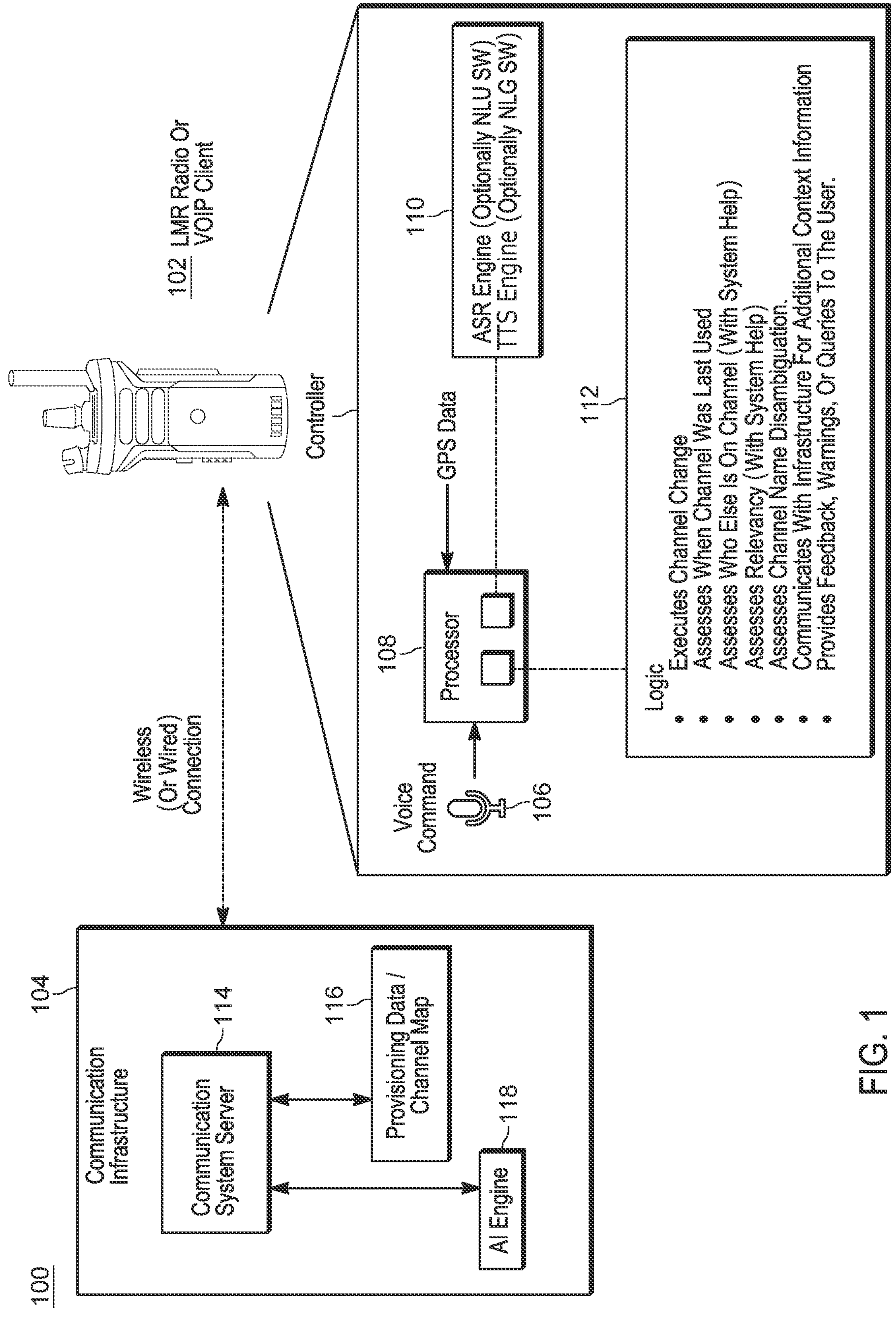
FIG. 1 is a block diagram of a communication system formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Attempting to control the channel change function of a two-way radio via a voice control feature presents several challenges. For example, while the two-way radio may confirm a new channel by audio response, the audio confirmation might not be heard by the user under noisy environments. As another example, if the user specifies an incorrect channel, perhaps due to stress, distraction, or loud background noise, then device voice confirmation of the incorrect channel may go unnoticed by the user. Another particular challenge unique to public safety radios, sometimes referred to as a 'namespace issue', may limit the ability to assign unique channel names, resulting in a device having the same channel name on two or more zones. Another challenge is the potential for name re-use across multiple zones. The user may specify the correct channel name, but the user may not specify the correct zone. Some implementations may require channel and zone to always be specified; while other implementations may require channel specification to be required and zone specification is optional. In the latter case, the channel change request is limited to the current zone. If the user mistakenly believes he is on a different zone, the wrong channel could be selected if the channel name is re-used across zones. While using unique channel names may avoid this issue, those skilled in the art will appreciate that this may add further complexity and cognitive loading to a user of a device with many hundreds of channels. For example, many radio systems use channel names to describe function which are then grouped into zones which map to geographical regions.

Briefly, there is provided herein an optimized voice control feature for improving voice controlled channel change operation of a two-way radio, such as mobile (vehicular) or a portable (handheld) half-duplex communication devices that use push-to-talk (PTT) control. The embodiments include an improved voice-controlled channel change operation based on a computed channel change confidence level compared to one or more channel change confidence thresholds. The thresholds may be adaptively determined and customized for each user and/or radio based on channel context parameter monitoring. Alerts, warnings and dialog prompting may be generated to accompany the channel change (or no change) based channel context parameters associated with one or more of the user, two-way radio, and communication system.

More particularly, the embodiments provide for a two-way radio operating within a communication system, wherein the two-way radio includes a controller configured to detect a voice command input to the two-way radio to change a dispatch communication channel from a current channel to a target channel, the voice command including a target channel name, and computing a channel change confidence level between the entered target channel name and a known channel of the communication system. The dispatch communication channel is changed from the current channel to the target channel in response to the channel change confidence level being equal to or above a channel confidence threshold. The dispatch communication channel may be changed (or not changed) in response to the channel change confidence level being below the channel confidence threshold. The two-way radio generates a low-confidence user-alert indicating the low-confidence channel change. Customized alerts and queries may be generated for moderate channel chance confidence levels.

The channel change confidence level may be computed based on one or more of channel context parameters monitored by the two-way radio and/or the system, such as recent activity on the target channel exceeding an activity threshold, the last time the user operated the device on the target channel exceeds a time threshold, channel usage by others on the desired channel, and communication content on the target channel exceeding a relevancy threshold.

The embodiments further provide for a method for voice controlled channel change of a two-way radio operating within a communication system, comprising the steps of: detecting a voice command at the two-way radio to change a dispatch communication channel from a current channel to a target channel, the voice command including a target channel name; and computing a channel change confidence level between the entered target channel and a known channel of the communication system. The method continues by changing the dispatch communication channel from the current channel to the target channel in response to the channel change confidence level being equal to or above a channel confidence threshold, and generating a low-confidence user-alert indicating a low-confidence channel change in response to the channel change confidence level being below the channel confidence threshold.

The channel change confidence level may be computed based on one or more of monitored channel context parameters, such as determining if recent activity on the target channel exceeds an activity threshold, determining if the last time the user operated the device on the target channel exceeds a time threshold, determining if other users have selected the desired communication channel, and determining if communication content on the target channel exceeds a relevancy threshold.

FIG. 1 is a block diagram of a communication system 100 formed and operating in accordance with some embodiments. The embodiments apply to a single two-way radio, as well as a plurality of two-way radios, sometimes referred to as a fleet interoperating over a communication infrastructure 104, and also to mobile (vehicular) two-way radios. Each two-way radio 102 includes transceivers and controllers for operating over a communications infrastructure 104. Each two-way radio 102 provides half-duplex communication associated with the communications infrastructure 104. For example, two-way radio 102 may be, for example, a land mobile radio (LMR) or voice over internet protocol (VoIP) client device or other device having two-way half-duplex PTT capability.

The communications infrastructure 104 may provide operation over one or more communication networks using for example, narrowband operation, broadband operation, and wireless interfaces, such as LMR, Wi-Fi, LTE 4G, LTE 5G, to name a few. The communication infrastructure 104 includes centralized servers, controllers, and repeaters and may include provisioning and fleet management capabilities. Such infrastructure may further include the ability to communicate with, and exchange status information with, other similar systems across a broad geographic area. The embodiments of the present application are directed to the processing and improvement of channel change voice commands, and hence only the radio elements and infrastructure elements directly associated with that functionality are shown and discussed.

Two-way radio 102 includes a controller which processes a channel change voice command input to a microphone 106 via a processor 108, wherein the processor 108 is configured to operate with software modules including an automatic speech recognition (ASR) 110 engine and may further include a text-to-speech (TTS) engine. The processor 108 is further configured to manage processing logic functions 112. The processing logic functions 112 may be configured within the processor 108, the server 114, and/or within a cloud based analytics engine (not shown) associated with the communication system 100, or any combination thereof.

For the purposes of this application, the communications infrastructure 104 is shown to include and/or interoperate with a server 114. The server 114 maintains a plurality of communication channels over which the two-way radio 102 may operate (shown as channel mapping 116). The server 114 manages the channel mapping 116 based on provisioning data associated with each two-way radio 102 and as well as other data associated with each two-way radio (i.e. some radios are used by more than one client). Additionally, the server 114 has access to contextual information of each two-way radio 102 and its user(s) operating within the communication system 100. Such contextual information may include for example, workgroup information (e.g. the server may track which radio user communicates with other radio users within a workgroup or agency), geographic information (e.g. the server may track changes from a geographic 'home' base associated with each radio via the radio's internal GPS data tracking), and recent communication history (e.g. the server may track recent history of all channel usage).

The server 114 may also include and/or interoperate with an artificial intelligence (AI) engine 118. Communications infrastructure 104 may utilize the AI engine 118 to track a broader range of data across a fleet of radios, over longer periods of time. For example, the AI engine 118 may determine that a zone or group of channels is associated with a particular geographic region. A channel change to a channel within that group when the device is geographically positioned in another area would be highly relevant contextual information that may be relayed back to the two-way radio 102. The server may determine whether the target channel name is available for use.

The following Table shows an example of zone and channel for a two-way radio.

| ZONE | CHANNEL |
|---|---|
| Zone A | Tactical North, Dog Catcher |
| Zone B | Tactical North, Tactical South |
| Zone County South | Tactical 1, Tactical 2, Tactical 3, Tactical 4 |
| Zone County North | Tactical 4, Tactical 5, Tactical 6, Tactical 7 |

Two-way radio 102 may be provided with a command to change the channel only, the zone only, or both the zone and the channel. Within this specification, a channel change command may refer to any of these combinations. A zone is a logical group of channels, and each zone may have multiple channels. Additionally, it is not unusual for the same channel name to be used in different zones. The channel is a dispatch channel which may also be referred to as a talkgroup. In some cases, a channel name used across zones may represent the same channel (to provide ease of access), while in other cases it might represent different channels (because they are in different zones). The zone and channel configuration is entirely at the discretion of the communication manager performing the provisioning and configuration of communications infrastructure 104 and the fleet of two-way radios 102.

From a user perspective, a user may initiate voice control with a designated user input button or a wake word and subsequently issue a select channel command to change talkgroups, including a target name for the talkgroup. For example, "Change Channel to Tactical 7" may be spoken into the microphone 106. The ASR engine 110, preferably utilizing natural language understanding (NLU) software, detects the dispatch channel change command input to microphone 106 which includes the target name of a desired channel, and coverts the verbal input to text. The processor 108 then scans radio channels (doing a comparison to known channels) to determine a channel match. For example, the processor 108 determines whether that the channel name "Tactical 7" is recognized by the two-way radio 102 and/or the communication system 100. However, in some cases, a channel change voice command may sound ambiguous to the ASR engine 110. For example, "Tactical 7" and "Tactical 70" may sound very similar to the ASR engine 110, thereby causing ambiguity. Additionally, as stated earlier unrecognized channel change voice commands may arise by a variety of different causes, including, high background noise may cause ambiguity to the processing of the channel change command. Some users may even issue an invalid or unrecognized channel change command. In some cases, a user may speak invalid channel change command due to stress or being distracted. In some two-way radio applications, ambiguity may arise due to the same channel name may being used on two or more zones In the Table, for example, talkgroup "Tactical North" is present in both Zone A and Zone B, and talkgroup 'Tactical 4' is present in both Zone County South and Zone County North. Two-way radio 102 may first determine if a common channel name maps to a common channel or if a common channel name maps to different channels (typically per zone). These ambiguities may negatively impact processor 108 capabilities to properly perform the voice controlled channel change.

In accordance with some embodiments, a channel change confidence level is computed between the input target channel and a known channel of the communication system. The confidence level may be computed based on one or more channel context parameters, where such context parameters may be determined by processing logic functions 112 of the two-way radio 102 and/or channel context parameters tracked through the communications infrastructure 104, such as tracked by the server 114 and AI engine 118. The channel context parameters may include, but are not limited to: recent activity on the recognized channel, length of time since the channel was last selected, and/or the presence of other users using (or recently using) the channel. The presence of other users on the channel may be further refined based on a geographical context and/or known work-partners. The confidence level may also be computed based on comparing relevancy of communication content on the recognized channel to a previous channel used by the user. The confidence level may also include determining the presence of a similarly-named channel in a different zone or namespace. All or some of these channel context parameters may be used to compute a channel change confidence level for comparison to a channel confidence threshold.

The various channel context parameters used to determine the channel confidence threshold and computation of the actual confidence level may be monitored either by the two-way radio 102, the communication infrastructure 104, and/or a combination thereof. For example, verbal channel change voice command entries may be monitored by the two-way radio 102 (e.g. monitor recent usage of a channel). The processing logic functions 112 communicating with the system server 114 may assess when a channel was last used, who else is on the channel, conversation relevancy taking place on the target channel, channel name ambiguities, control requests for additional context information, and trigger feedback, warning, and/or queries to the user. The communication infrastructure 104 may monitor channel usage throughout a fleet, as well as perform monitoring conversations to determine relevancy to a channel change request. For example, the system monitoring of channel change commands throughout a fleet can be monitored by AI engine 118, and mapped via channel mapping 116. The channel change confidence level can be compared to one or more channel change confidence thresholds. The thresholds can be dynamically updated over time as user and system usage may vary over time. Likewise the user alerts may be adaptively configured for various confidence levels. For the purposes of example, first and second channel change confidence thresholds are described.

Depending on the confidence level computed for a channel change request, one of the following channel change outcomes may occur: if the confidence level is equal to or above a first channel change confidence threshold, the channel will be changed and confirmation provided. If the confidence level is below a first threshold and above or equal to a second channel change confidence threshold, then one of the following will occur: change the channel and generate a warning alert to the user; or generate a query requesting additional information or confirmation from the user. If the confidence level falls below the second channel change confidence threshold, then channel change will not occur and an alert will be sent from the portable communication device to alert the user as to why the channel change was not made.

Various feedback, warning and/or queries may be communicated to the user via verbal or text format as a result of the confidence level computed for a channel change request and the analytics associated therewith. In accordance with the embodiments, the two-way radio 102 can present verbal feedback to the user warning the user of a moderate or low confidence level regarding the channel change request. A verbal warning of a low confidence level in the channel change may be communicated to the user via a verbal message such as, for example, "there has been no activity on this talkgroup in the past 2 hours". As another example, the two-way radio 102 may monitor and maintain a record of a 'last access time' for each channel/talkgroup. In this case, a verbal message of a low confidence level may be communicated by the two-way radio 102 with a verbal message of, for example: "this device has not selected this channel in the past month".

As mentioned previously communications infrastructure 104 may monitor affiliation of the two-way radio 102 to a talkgroup (preferably including time of affiliation). If a user-initiated channel change command is made that has a low confidence level associated with the selected talkgroup, then the system can send a feedback message for play out at the two-way radio 102. Example of low confidence level warnings might include, "you are the only person affiliated with the selected channel", "two users on this channel, the other recently joined", as well as other messages configured to the identified user/usage.

As mentioned previously, the communications infrastructure 104 may also monitor conversations of a plurality of talkgroups for various purposes, such as monitoring topics/keywords and discussion threads. The communications infrastructure 104 can determine if a user switching from Channel X to Channel Y has selected a channel with a very different conversation. In this example, the low confidence level might be communicated by a message sent from the infrastructure for play output by the two-way radio 102, such as "the current conversation is about vehicle repair". A query or request for confirmation may be generated, such as for example. "please confirm that you wish to join discussion on vehicle repair". A warning pertaining to channel name disambiguation may be generated, for example, "'Tactical 4' appears in multiple zones. There is activity in Talkgroup Tactical 4 on zone County South".

Figure 2:
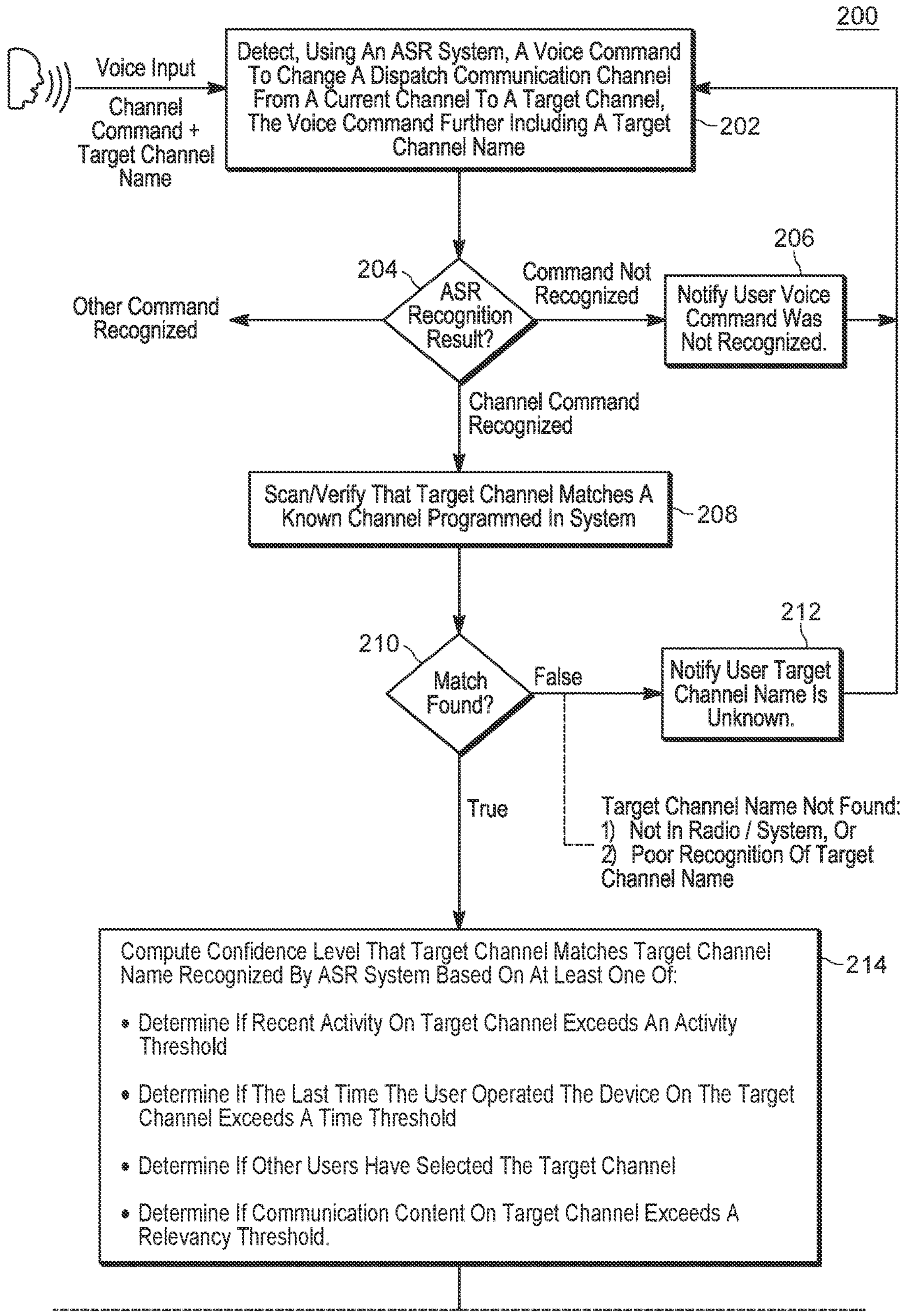
FIG. 2 is a method for selecting a dispatch communication channel using a voice interface of a radio operating within the communication system of FIG. 1 in accordance with some embodiments.
Figure 2:
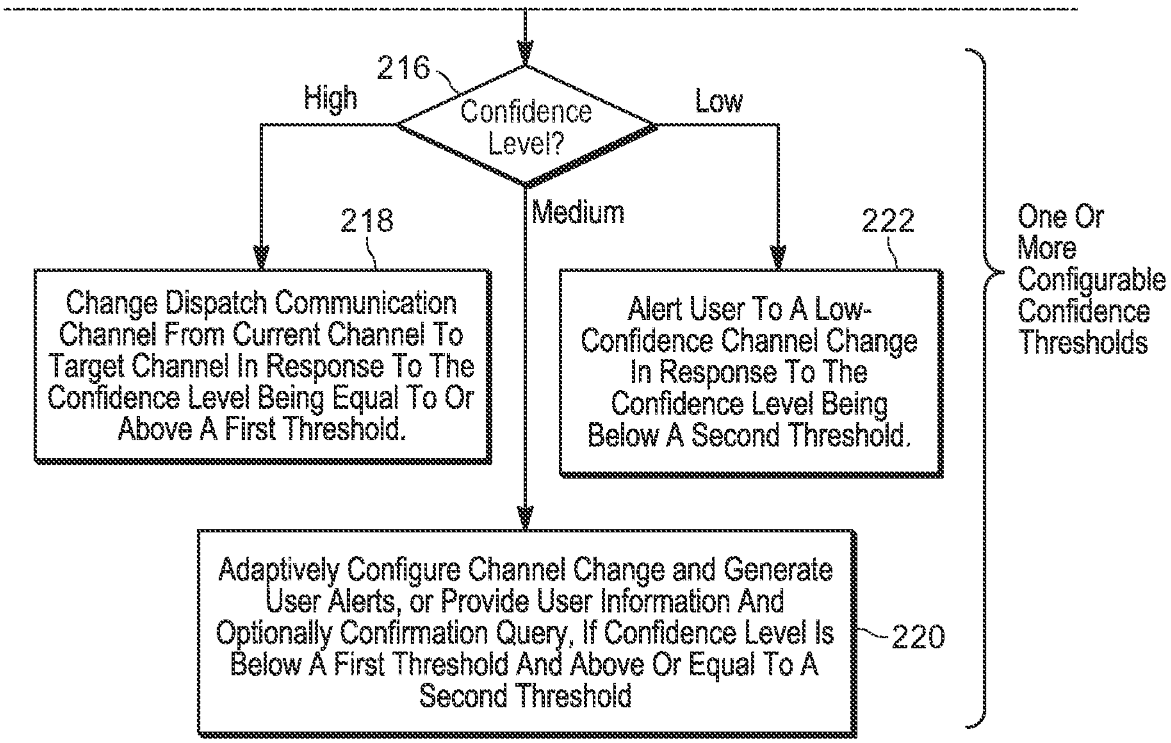

FIG. 2 is a method 200 for voice controlled channel change of a two-way radio operating within communication system 100 of FIG. 1 in accordance with some embodiments. Method 200 begins at 202 by detecting, using automatic speech recognition (ASR) engine, a voice command input at the two-way radio to change a dispatch communication channel from a current channel to a target channel, the voice command including a target channel name. The method continues at 204 by determining if a valid command, such as "Change Channel", was recognized by the ASR engine. If no command was recognized, the method returns to 202. If a different command is recognized (other than a channel change command), then alternative command processing may occur associated with the recognized command (not shown).

When a channel change command, including the target channel name, is recognized at 204, (i.e. there is a match) the method can continue directly to 214 by, computing a channel change confidence level between the entered target channel and the known channel of the communication system. The confidence level may be computed based on one or more of: determining if recent activity on the target channel exceeds an activity threshold, determining if the last time the user operated the device on the target channel exceeds a time threshold; determining if other users have selected the target channel, and determining if communication content on the target channel (i.e. conversation content) on the target channel exceeds a relevancy threshold. The computations taking place at 214 may be based on, as previously described, monitoring channels by the two-way radio, by the server and AI engine, and/or a combination thereof.

The method 200 continues at 208 by scanning to determine whether the target channel name included in the voice command matches a known channel of the communication system. If a match is not determined at 210, then a notification alert can be generated by the radio at 212 to alert the user that the target channel name is unknown. This situation might occur under conditions in which the target channel name is not found because it was never programmed into the radio or system, or might occur as a result of poor recognition of the target channel name by the ASR engine. The processing at 208, 210 eliminates having to process unrecognized target channel names through the confidence level computation.

The confidence level computed at 214 may compared in step 216 to one or more channel change confidence thresholds. For this example, first and second channel change confidence thresholds have been configured, wherein the channel change takes place in response to the channel change confidence level being above a first confidence threshold 218, and the channel change not taking place in conjunction with generation of a warning/alert when the channel change confidence level falls below a second confidence level threshold 222. Moderate confidence levels (those that fall between the first and second confidence thresholds) may be used as a basis to adaptively configure channel change and generate user alerts at 220. For example, channel change taking place in conjunction with generating an alert indicating the channel parameter associated with the moderate confidence level; or channel change not taking place along with generating a feedback indicating the channel parameter associated with the moderate confidence level; or generating an inquiry seeking more information and/or confirmation of the channel associated with the moderate confidence level prior to making the channel change.

The number of confidence levels and channel change confidence thresholds along with associated logic shown in steps 216, 218, 220, and 222 are an example implementation and the invention is not limited to a specific number of channel change confidence thresholds. For example, a single channel change confidence threshold may be applied at step 216, wherein the channel change confidence threshold may be configured to result in, for example, one of two outcomes, such as change channel when computed channel change is above the channel change confidence threshold, and generate an alert when the computed channel change is equal to or below the channel change confidence threshold. The channel change may still take place in response to a low confidence, but the user is made aware of this low confidence and may be further asked to confirm channel. Additionally, the actual actions (i.e. user interactions or lack thereof) to be taken at the possible results are configurable and may be advantageously adapted to product-specific applications.

Additionally, in some embodiments, different weighting factors may be applied to different monitored channel context parameters, and those monitored channel context parameters may be weighted differently for different users of a two-way radio, for example depending on past history of channel usage, incident type, past talkgroup interaction, and channel context parameters that can be monitored, tracked, and learned by the radio processor and/or the communication system.

Accordingly, there has been provided a communication system, radio and method that provide for improved channel change voice control operation of a portable two-way radio. The embodiments are particularly advantageous to two-way radios operating in public safety environments and/or industrial commercial environments, where reliable execution of voice controlled channel change is so important.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for voice controlled channel change of a two-way radio operating within communication system, comprising the steps of:

detecting a voice command at the two-way radio to change a dispatch communication channel from a current channel to a target channel, the voice command including a target channel name;

scanning to determine whether the target channel name included in the voice command matches a known channel of the communication system;

computing, in response to a match, a channel change confidence level between the target channel and the known channel of the communication system based on monitored channel context parameters indicative of at least one of: target channel activity, radio usage time on the target channel, other radio users having selected the target channel, and communication content relevancy on the target channel;

changing the dispatch communication channel from the current channel to the target channel in response to the channel change confidence level being equal to or above a channel change confidence threshold; and generating a low-confidence user-alert indicating a low-confidence channel change in response to the channel change confidence level being below the channel change confidence threshold, wherein the low-confidence user-alert provides an indication of one or more of the channel change context parameter associated with the channel change confidence level being below the channel change confidence threshold.

2. The method of claim 1, wherein the monitored channel context parameters include at least one of channel context parameters monitored by the communication system and channel context parameters monitored by the two-way radio.

3. The method of claim 1, wherein computing the channel change confidence level based on the monitored channel context parameters includes:

determining if recent activity on the target channel exceeds an activity threshold;

determining if radio usage on the target channel exceeds a usage time threshold;

determining if other radio users have selected the target channel; and determining if communication content on the target channel exceeds a relevancy threshold.

4. The method of claim 1, wherein the channel change confidence threshold is determined based on:

tracking and storing channel context parameters associated with the two-way radio; and tracking and storing context parameters associated with the known channel.

5. The method of claim 1, wherein further comprising:

applying weighting factors to different channel context parameters.

6. The method of claim 1, wherein two-way radio is a public safety radio or industrial commercial radio.

7. The method of claim 1, wherein the channel change confidence threshold comprises a first channel change confidence threshold and a second change confidence threshold, and the voice controlled channel change further comprises the step of:

adaptively configure channel change and generate a user feedback alert, in response to a moderate channel change confidence level that falls between the first channel change confidence threshold and the second channel change confidence threshold, the user feedback alert including a feedback user query pertaining to the one or more channel context parameters associated with the moderate channel change confidence level.

8. A communication system, comprising:

a communications infrastructure;

a plurality of two-way radios operating within the communications infrastructure, each two-way radio providing a voice controlled channel change feature, the voice controlled channel change feature being configured to:

detect a voice command input at the two-way radio to change a dispatch communication channel from a current channel to a target channel, the voice command including a target channel name;

scan radio channels to determine if the detected voice command including the target channel name is a match to a known channel of the communication system;

compute, in response to a match, a channel change confidence level based on monitored channel change context parameters indicative of one or more of: past channel activity of the two-way radio on the target channel, past usage time on the target channel, and conversation relevancy taking place on the target channel;

change the dispatch communication channel from the current channel to the target channel in response to the channel change confidence level being equal to or above a channel change confidence threshold; and generate a low-confidence user-alert in response to the channel change confidence level being below the channel change confidence threshold, wherein the low-confidence user-alert provides an indication of one or more of the channel change context parameters associated with the channel change confidence level being below the channel change confidence threshold.

9. The communication system of claim 8, wherein the channel change confidence threshold is adaptively configured based on channel context parameters monitored by one or more of:

each two-way radio of the plurality of two-way radios, and the communication system.

10. The communication system of claim 8, wherein the plurality of two-way radios comprise:

public safety radios; or industrial commercial radios.

11. The communication system of claim 8, wherein weighting factors are applied to different monitored channel context parameters.

12. The communication system of claim 8, wherein the channel change confidence threshold comprises a first channel change confidence threshold and a second change confidence threshold, and the voice controlled channel change feature is further configured to:

adaptively configure channel change and generate a user feedback alert, in response to a moderate channel change confidence level that falls between the first channel change confidence threshold and the second channel change confidence threshold, the user feedback alert including a feedback user query pertaining to the one or more channel context parameters associated with the moderate channel change confidence level.

13. A two-way radio, comprising:

a controller providing a voice controlled channel change feature, the controller being configured to:

detect a voice command input at the two-way radio to change a dispatch communication channel from a current channel to a target channel, the voice command including a target channel name;

scan radio channels to determine if the detected voice command including the target channel name is a match to a known channel of the two-way radio or a known channel of a communication system within which the two-way radio operates;

compute, in response to a match, a channel change confidence level based on monitored channel change context parameters indicative of one or more of: past channel activity of the two-way radio on the target channel, past usage time on the target channel, and conversation relevancy taking place on the target channel;

change the dispatch communication channel from the current channel to the target channel in response to the channel change confidence level being equal to or above a channel change confidence threshold; and generate a low-confidence user-alert in response to the channel change confidence level being below the channel change confidence threshold, wherein the low-confidence user-alert provides an indication of one or more of the channel change context parameters associated with the channel change confidence level being below the channel change confidence threshold.

14. The two-way radio of claim 13, wherein the channel context parameters include channel context parameters monitored by the two-way radio itself.

15. The two-way radio of claim 14, wherein the channel context parameters further include channel context parameters monitored within the communication system within which the two-way radio operates.

16. The two-way radio of claim 15, wherein different weighting factors are applied to system and radio monitored channel context parameters.

17. The two-way radio of claim 13, wherein the two-way radios comprises:

a public safety radio; or an industrial commercial radio.

18. The two-way radio of claim 13, wherein the channel change confidence threshold is configurable to a plurality of channel change confidence thresholds.

19. The two-way radio of claim 13, wherein the channel change confidence threshold is configurable to a plurality of channel change confidence thresholds based on channel context parameters monitored within the two-way radio and the communication system within which the two-way radio operates.

20. The two-way radio of claim 13, wherein the channel change confidence threshold is configurable, and the controller is further configured to:

adaptively configure channel change and generate a user-alert, in response to moderate confidence levels that fall between the first and second channel change confidence thresholds, the user alert including a feedback user query pertaining to one or more of the channel change context parameters associated with the moderate channel change confidence level.

21. A method for voice controlled channel change of a two-way radio operating within communication system, comprising the steps of:

detecting a voice command at the two-way radio to change a dispatch communication channel from a current channel to a target channel, the voice command including a target channel name;

scanning to determine whether the target channel name included in the voice command matches a known channel of the communication system;

computing, in response to a match, a channel change confidence level between the target channel and the known channel of the communication system based on monitored channel context parameters indicative of at least one of: target channel activity, radio usage time on the target channel, other radio users having selected the target channel, and communication content relevancy on the target channel;

changing the dispatch communication channel from the current channel to the target channel in response to the channel change confidence level being equal to or above a first channel change confidence threshold;

generating a low-confidence user-alert indicating a low-confidence channel change in response to the channel change confidence level being equal to or below a second channel change confidence threshold, wherein the low-confidence user-alert provides an indication of one or more of the channel change context parameters associated with the channel change confidence level being below the second channel change confidence threshold; and generating a moderate-confidence user-alert indicating a moderate-confidence channel change in response to the channel change confidence level being between the first channel change confidence threshold and the second channel change confidence threshold, wherein the moderate-confidence user-alert provides an indication of one or more of the channel change context parameters associated with the channel change confidence level being between the first channel change confidence threshold and the second channel change confidence threshold.

* * * * *